United States Patent
Jang et al.

(10) Patent No.: US 10,651,454 B2
(45) Date of Patent: May 12, 2020

(54) RECHARGEABLE BATTERY

(71) Applicant: SAMSUNG SDI CO., LTD., Yongin-si, Gyeonggi-do (KR)

(72) Inventors: Myung-Jae Jang, Yongin-si (KR); Chi-Young Lee, Yongin-si (KR); Sang-Won Byun, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 229 days.

(21) Appl. No.: 14/882,991

(22) Filed: Oct. 14, 2015

(65) Prior Publication Data

US 2016/0308188 A1    Oct. 20, 2016

(30) Foreign Application Priority Data

Apr. 17, 2015 (KR) ..................... 10-2015-0054587

(51) Int. Cl.
*H01M 2/30* (2006.01)
*H01M 2/06* (2006.01)
*H01M 2/04* (2006.01)
*H01M 2/26* (2006.01)

(52) U.S. Cl.
CPC .......... *H01M 2/30* (2013.01); *H01M 2/0456* (2013.01); *H01M 2/06* (2013.01); *H01M 2/26* (2013.01)

(58) Field of Classification Search
CPC ......... H01M 2/30; H01M 2/0456; H01M 2/06
See application file for complete search history.

(56) References Cited

U.S. PATENT DOCUMENTS

| 2010/0092858 A1* | 4/2010 | Takashiro | H01M 2/021 429/178 |
| 2011/0003180 A1* | 1/2011 | Lee | H01M 2/021 429/7 |

* cited by examiner

*Primary Examiner* — Ula C Ruddock
*Assistant Examiner* — Frank A Chernow
(74) *Attorney, Agent, or Firm* — Lee IP Law, PC (57) ABSTRACT

A rechargeable battery includes an electrode assembly including first and second electrodes, a case in which the electrode assembly is accommodated, a cap plate combined to an opening of the case, the cap plate including a first terminal hole and a second terminal hole, a first electrode terminal passing through the first terminal hole of the cap plate and a second electrode terminal passing through the second terminal hole of the cap plate, and a lead tab connecting the electrode assembly to the second electrode terminal. The second electrode terminal includes a press-fit portion protruding therefrom, the press-fit portion being press-fitted to the second terminal hole of the cap plate.

11 Claims, 8 Drawing Sheets

RECHARGEABLE BATTERY

CROSS-REFERENCE TO RELATED APPLICATION

Korean Patent Application No. 10-2015-0054587, filed on Apr. 17, 2015, in the Korean Intellectual Property Office, and entitled: "Rechargeable Battery," is incorporated by reference herein in its entirety.

BACKGROUND

1. Field

Embodiments relate to a rechargeable battery.

2. Description of the Related Art

Generally, a rechargeable battery differs from a primary battery in that a rechargeable battery can be repeatedly charged and discharged, while a primary battery is incapable of being recharged. A low-capacity rechargeable battery may be used in small portable electronic devices such as mobile phones, notebook computers, and camcorders, while a high-capacity rechargeable battery may be used as a power source for driving a motor of a hybrid vehicle.

Types of rechargeable batteries include a nickel-cadmium (Ni—Cd) battery, a nickel-metal hydride (Ni-MH) battery, a lithium (Li) battery, a lithium ion (Li-ion) battery, etc. The lithium ion rechargeable battery has an operating voltage about three times as high as that of the Ni—Cd battery or Ni-MH battery that is widely used as a power supply for electronic devices. In addition, the lithium ion rechargeable battery has been widely used because its energy density per unit weight is high.

In the rechargeable battery, a lithium-based oxide has been used as a positive active material, and a carbon material has been used as a negative active material. Generally, batteries are classified into a liquid electrolyte battery and a polymer electrolyte battery depending on the type of electrolyte, and lithium batteries using a liquid electrolyte are called lithium ion batteries while batteries using a polymer electrolyte are called lithium polymer batteries.

SUMMARY

Embodiments are directed to a rechargeable battery including an electrode assembly including first and second electrodes, a case in which the electrode assembly is accommodated, a cap plate combined to an opening of the case, the cap plate including a first terminal hole and a second terminal hole, a first electrode terminal passing through the first terminal hole of the cap plate and a second electrode terminal passing through the second terminal hole of the cap plate, and a lead tab connecting the electrode assembly to the second electrode terminal. The second electrode terminal includes a press-fit portion protruding therefrom, the press-fit portion being press-fitted to the second terminal hole of the cap plate.

The second electrode terminal may include a plate terminal disposed outside of the cap plate above the second terminal hole, a rivet terminal electrically coupled to the lead tab and penetrating the terminal hole, the rivet terminal being riveted to the plate terminal. The press-fit portion may protrude outwardly from the rivet terminal to be press-fitted to the second terminal hole.

The press-fit portion may protrude from an external circumference of the rivet terminal to have a rounded or circular shape.

The second electrode terminal may further include a flange that protrudes integrally from the rivet terminal at an inner side of the cap plate.

The rechargeable battery may further include a conductive top plate between the second plate terminal and the cap plate.

The cap plate may further include a stopper protrusion that protrudes from a lower part of the second terminal hole to contact the press-fit portion.

The stopper protrusion may include a pair of stopper protrusions protruding from the lower part of the second terminal hole.

The stopper protrusion protruding from the lower part of the second terminal hole may have a circular shape.

The press-fit portion may include a plurality of press-fit portions protruding outwardly from the rivet terminal.

The press-fit portions may extend outwardly from the second electrode terminal in a form of protrusions and depressions that are equally spaced.

The press-fit portion may protrude outwardly from the second electrode terminal to have a polygonal shape.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 1:
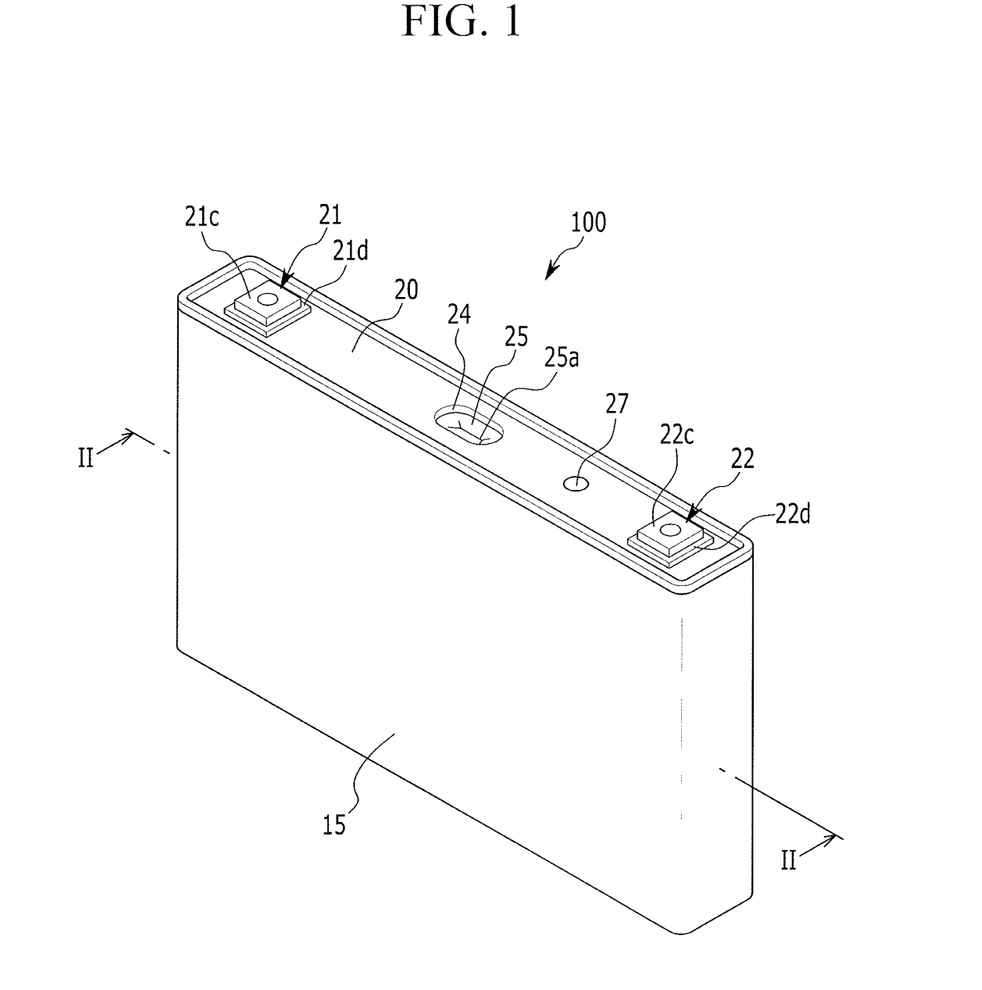
FIG. 1 illustrates a schematic perspective view of a rechargeable battery according to an exemplary embodiment.
Figure 2:
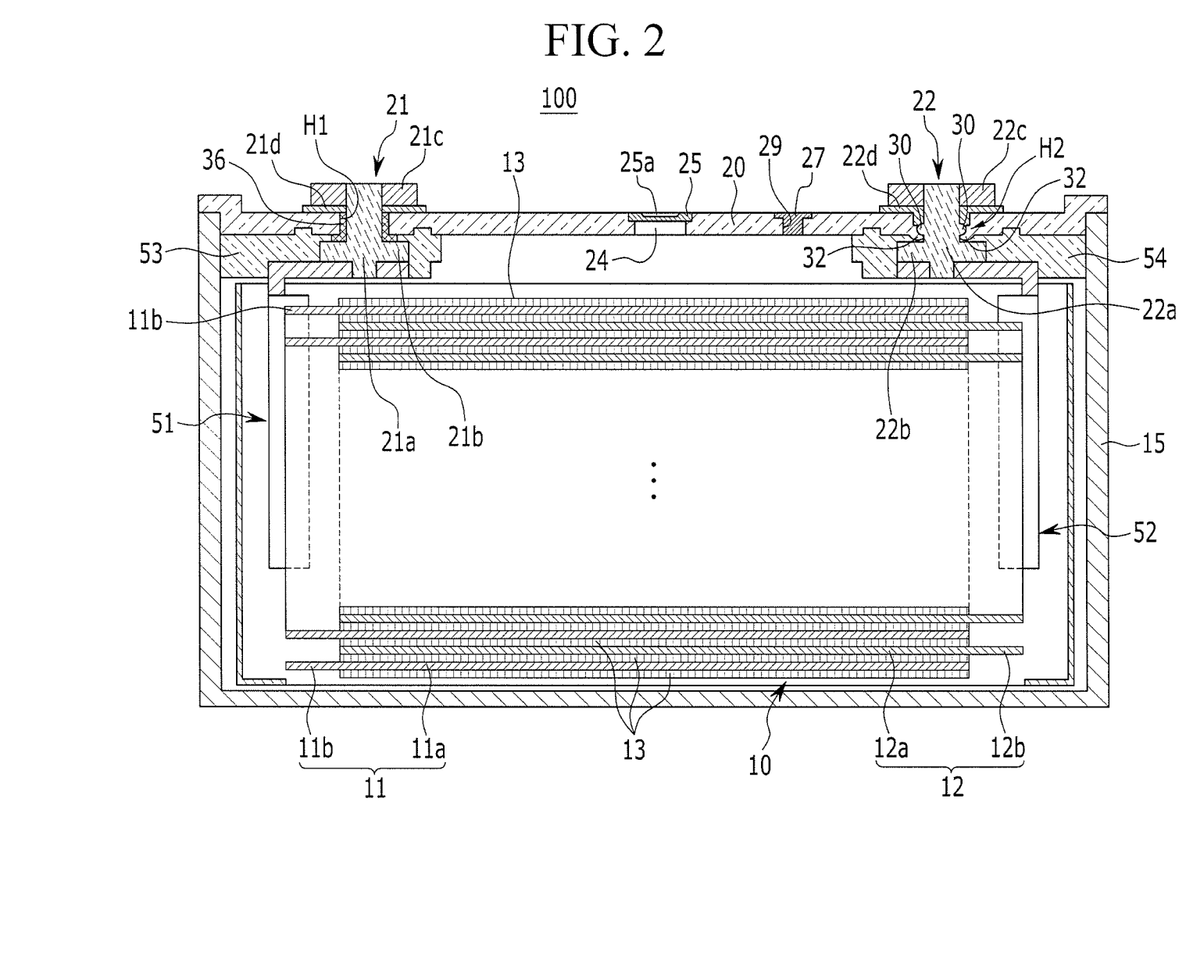
FIG. 2 illustrates a cross-sectional view of the rechargeable battery of FIG. 1 taken along the line II-II.

FIG. 1 illustrates a schematic perspective view of a rechargeable battery according to an exemplary embodiment, and FIG. 2 illustrates a cross-sectional view of the rechargeable battery of FIG. 1 taken along the line II-II.

As shown in FIGS. 1 and 2, the rechargeable battery 100 according to this exemplary embodiment includes: an electrode assembly 10 including a first electrode 11 and a second electrode 12; a case 15 for accommodating the electrode assembly 10; a cap plate 20 combined to an opening of the case 15 and formed with terminal holes H1 and H2; electrode terminals 21 and 22 provided in the terminal holes H1 and H2 of the cap plate 20 and including a first electrode terminal 21 and a second electrode terminals 22; and a press-fit portion 30 protruding from a lateral surface of the second electrode terminal 22 and press-fitted to the terminal hole H2 of the cap plate 20.

The electrode assembly 10 may be formed by disposing the first electrode (hereinafter referred to as a "negative electrode") 11 and the second electrode (hereinafter referred to as a "positive electrode") 12 at opposite surfaces of a separator 13, which serves as an insulator, and spirally winding the negative electrode 11, the separator 13, and the positive electrode 12 in a jelly-roll state.

The positive and negative electrodes 11 and 12 may respectively include coated regions 11a and 12a where an active material is coated on a current collector made of a metal plate, and uncoated regions 11b and 12b where an active material is not coated thereon to be formed as exposed current collectors.

The uncoated region 11b of the negative electrode 11 may be formed at one end of the negative electrode 11 along the wound negative electrode 11. The uncoated region 12b of the positive electrode 12 may be formed at one end of the positive electrode 12 along the wound positive electrode 12. Accordingly, the uncoated regions 11b and 12b may be respectively disposed at the opposite ends of the electrode assembly 10.

As an example, the case 15 may be substantially formed as a cuboid in which a space for accommodating the electrode assembly 10 and an electrolyte solution is provided The opening may be formed at one side of the cuboid to connect inner and outer spaces of the case 15. The opening may allow the electrode assembly 10 to be inserted into the case 15.

The cap plate 20 may be installed in the opening of the case 15 to seal the case 15. The case 15 and the cap plate 20 may be made of aluminum, for example, and may be welded to each other.

In addition, an electrolyte injection opening 29, a vent hole 24, and terminal holes H1 and H2 may be provided in the cap plate 20. After the cap plate 20 is combined to the case 15, an electrolyte solution may be injected into the case 15 through the electrolyte injection opening 29. After the electrolyte solution is injected into the case, the electrolyte injection opening 29 may be sealed by a sealing cap 27.

The electrode terminals 21 and 22 may include a negative terminal 21 and a positive electrode terminal 22. The electrode terminals 21 and 22 may extend through the terminal holes H1 and H2 of the cap plate 20 and may be electrically coupled to the electrode assembly 10. The negative terminal 21 may be electrically coupled to the negative electrode 11 of the electrode assembly 10, and the positive electrode terminal 22 may be electrically coupled to the positive electrode 12 of the electrode assembly 10. The electrode assembly 10 may be electrically connected to the outside of the case 15 through the negative and positive electrode terminals 21 and 22.

The negative terminal 21 may include: a first plate terminal 21c disposed outside of the cap plate 20 above the terminal hole H1; a first rivet terminal 21a electrically coupled to a lead tab and penetrating the terminal hole H1 to be riveted to the first plate terminal 21c; and an upper insulating member 21d disposed between the cap plate 20 and the first plate terminal 21c.

The positive electrode terminal 22 may include: a second plate terminal 22c disposed outside of the cap plate above the terminal hole H2; a second rivet terminal 22a electrically coupled to a lead tab and penetrating the terminal hole H2 to be riveted to the second plate terminal 22c: and a press-fit portion 30 protruding outwardly from the second rivet terminal 22a and press-fitted to the terminal hole 142.

The second rivet terminal 22a may include an upper end that penetrates the terminal hole H2 and is inserted into a through-hole of the second plate terminal 22c. The positive electrode terminal 22 may further include a flange 22b that is formed integrally and widely with the second rivet terminal 22a at an inner side of the cap plate.

A conductive top plate 22d may be interposed between the second plate terminal 22c and the cap plate 20 to allow the second plate terminal 22c and the cap plate 20 to be electrically coupled to each other. The cap plate 20 may be maintained such that the cap plate 20 is electrically coupled to the electrode assembly 10 and the lead tab 52 of the positive electrode 12.

By combining the top plate 22d and the second plate terminal 22c to an upper end of the second rivet terminal 22a and then riveting or welding the upper end thereof, the top plate 22d and the second plate terminal 22c may be combined to the upper end of the second rivet terminal 22a. The second plate terminal 22c may be provided outside of the cap plate 20 while interposing the top plate 22d therebetween.

The positive electrode terminal 22 may be press-fitted into the terminal hole H2 of the cap plate 20 by the press-fit portion 30.

The press-fit portion 30 may be formed to protrude from an external circumference of the positive electrode terminal 22, for example, from the second rivet terminal portion 22a of the positive electrode terminal 22 and may be press-fitted into the terminal hole H2. Accordingly the positive electrode terminal 22 may be electrically coupled to the cap plate 20 by the press-fit portion 30.

Figure 3:
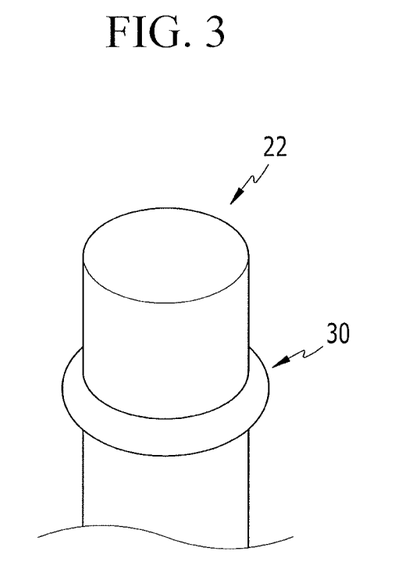
FIG. 3 illustrates a partial schematic perspective view of a press-fit portion protruding from a positive electrode terminal.
Figure 4:
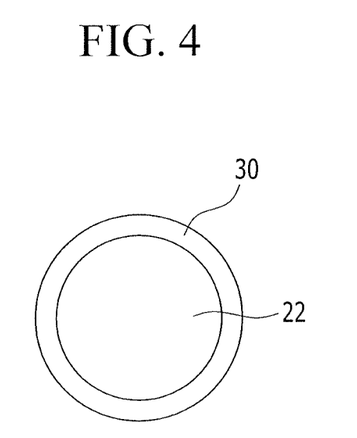
FIG. 4 illustrates a schematic top plan view of the press-fit portion protruding from the positive electrode terminal of the FIG. 3.
Figure 5:
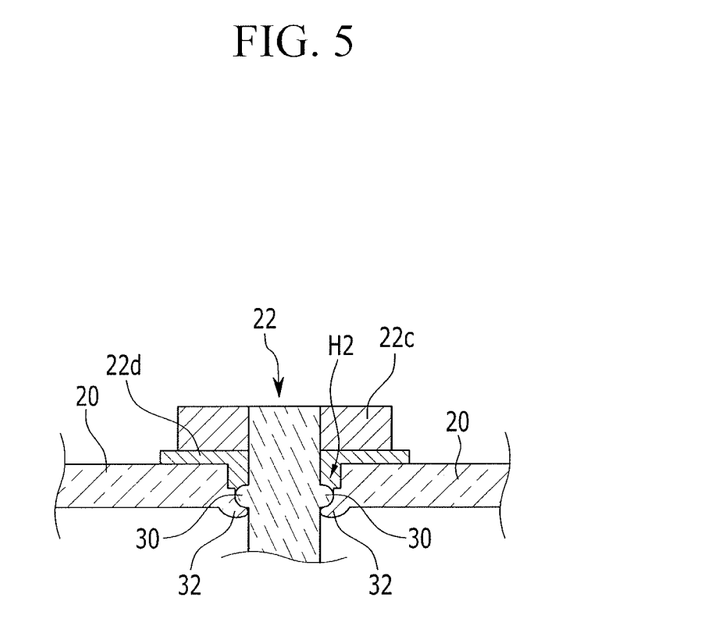
FIG. 5 illustrates a partial schematic cross-sectional view of the positive electrode terminal formed with the press-fit portion combined to the cap plate.

FIG. 3 illustrates a partial schematic perspective view of the press-fit portion protruding from the positive electrode terminal, FIG. 4 illustrates a schematic top plan view of the press-fit portion protruding from the positive electrode terminal of FIG. 3, and FIG. 5 illustrates a partial schematic cross-sectional view of the positive electrode terminal formed with the press-fit portion combined to the cap plate.

As shown in FIGS. 3 to 5, the press-fit portion 30 may protrude from the external circumference of the positive electrode terminal 22 to have a round or circular shape.

As such, the press-fit portion 30 may have the round shape extending outwardly from the positive electrode terminal 22, and may be forcedly fitted into the terminal hole H2 of the cap plate 20 to be press-fitted thereto. The positive electrode terminal 22 may have a simplified structure to be connected to the cap plate 20. Accordingly, the number of parts of the rechargeable battery be reduced.

The press-fit portion 30 is exemplarily illustrated as protruding outwardly from the positive electrode terminal 22 to have the round or circular shape. In some embodiments, the press-fit portion may have a polygonal shape that connects an inner wall surface of the terminal hole H2.

Figure 6:
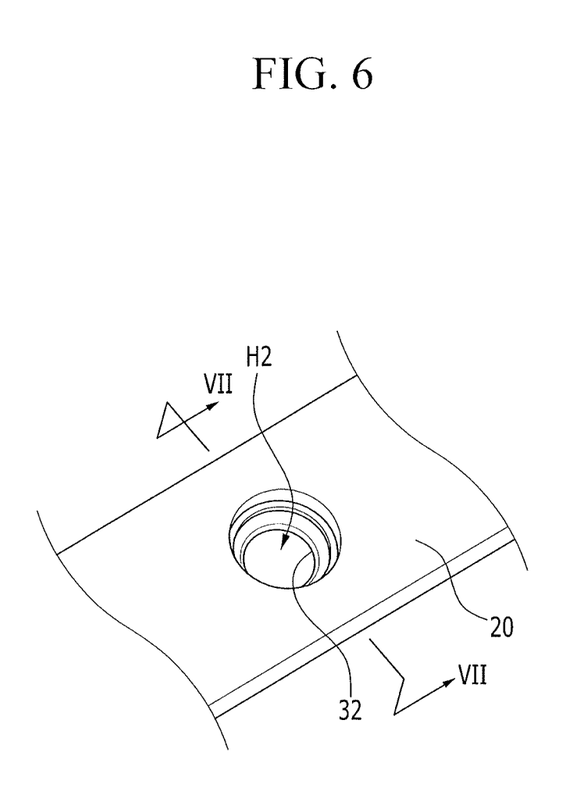
FIG. 6 illustrates a partial schematic perspective view of a stopper protrusion formed in a terminal hole.

A stopper protrusion 32 may be formed in a terminal hole H2 portion of the cap plate 20 to contact the press-fit portion 30.

Figure 7:
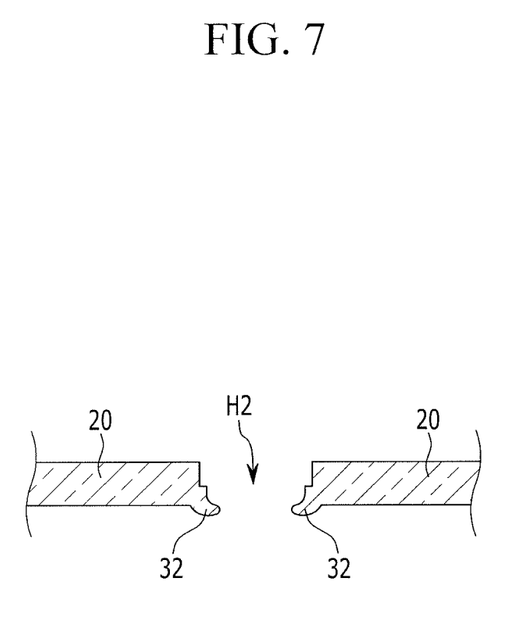
FIG. 7 illustrates a cross-sectional view of FIG. 6 taken along the line VII-VII.

FIG. 6 illustrates a partial schematic perspective view of the stopper protrusion formed in the terminal hole, and FIG. 7 illustrates a cross-sectional view of FIG. 6 taken along the line VII-VII.

As shown in FIGS. 6 and 7, the stopper protrusion 32 may protrude from an opened edge portion of the terminal hole H2, and may be formed in the cap plate 20 to contact some of the protruded press-fit portion 30. The stopper protrusion 32 may help to prevent the press-fit portion 30 from being excessively forced into the cap plate 20 while being press-fitted thereto. In the current exemplary embodiment, the stopper protrusion 32 may be formed along an edge circumference of the terminal hole H2 to have a round shape.

As described above, the positive electrode terminal 22 may be press-fitted to the terminal hole H2 of the cap plate 20 to be fixed thereto. Accordingly, the gasket may be omitted between the positive electrode terminal 22 and the cap plate 20, thereby reducing a manufacturing cost.

In addition, while the positive electrode terminal 22 is combined, the positive electrode terminal 22 may be stably and correctly positioned in the cap plate 20 by a position-restricting action of the stopper protrusion 32.

A negative electrode gasket 36 may be provided between the rivet terminal 21a of the negative terminal 21 and an inner surface of the terminal hole H1 of the cap plate 20. The negative electrode gasket 36 may seal and electrically insulate between the rivet terminal 21a of the negative electrode terminal 21 and the cap plate 20.

Negative and positive electrode lead tabs 51 and 52 may electrically couple the negative and positive electrode terminals 21 and 22 to the negative and positive electrodes 11 and 12 of the electrode assembly 10, respectively. By combining the negative and positive electrode lead tabs 51 and 52 to lower ends of the rivet terminals 21a and 22a and caulking the lower ends thereof, the negative and positive electrode lead tabs 51 and 52 may be supported by the flanges 21b and 22b and may be connected to the lower ends of the rivet terminals 21a and 22a.

The lower insulating members 53 and 54 may be respectively provided between the negative and positive electrode lead tabs 51 and 52 and the cap plate 20 to electrically insulate the negative and positive electrode lead tabs 51 and 52 from the cap plate 20. In addition, one side of each of the lower insulating members 53 and 54 may be combined to the cap plate 20 while the other side thereof may enclose the negative and positive electrode lead tabs 51 and 52, the rivet terminals 21a and 22a, and the flanges 21b and 22b, thereby stabilizing a connecting structure therebetween.

An upper insulating member 21d near the negative terminal 21 may electrically insulate between the negative terminal 21 and the cap plate 20.

The upper insulating member 21d may be interposed between the negative terminal 21 and the cap plate 20, and may be penetrated by the rivet terminal 21a. By combining the upper insulating member 21d to an upper end of the rivet terminal 21a and then caulking the upper end thereof, the upper insulating member 21d may be combined to the upper end of the rivet terminal 21a.

Figure 8:
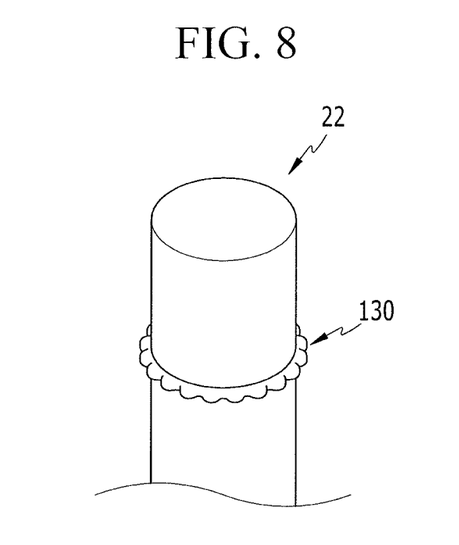
FIG. 8 illustrates a partial schematic perspective view of a press-fit portion protruding from a positive electrode terminal according to an exemplary embodiment.
Figure 9:
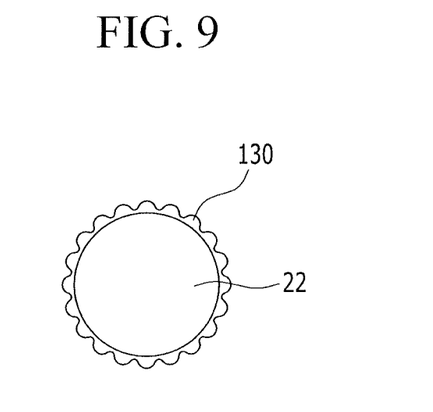
FIG. 9 illustrates a schematic top plan view of the press-fit portion protruding from the positive electrode terminal illustrated in FIG. 8.

FIG. 8 illustrates a partial schematic perspective view of a press-fit portion protruding from a positive electrode terminal according to an exemplary embodiment, and FIG. 9 illustrates a schematic top plan view of the press-fit portion protruding from the positive electrode terminal of FIG. 8. The same reference numerals as those in FIGS. 1 to 7 refer to the same members having the same functions. A detailed description of the same reference numerals will not be repeated hereafter.

As shown in FIGS. 8 and 9, a plurality of press-fit portions 130 according to this exemplary embodiment may protrude along an external circumference of a positive electrode terminal 22.

For example, the plurality of press-fit portions 130 may protrude along the external circumference of the positive electrode terminal 22 while forming protrusions and depressions that are equally spaced from each other.

As such, the plurality of press-fit portions 130 may be press-fitted to a terminal hole H2 while protruding along the external circumference of the positive electrode terminal 22 to have the protrusions and depressions. Accordingly, the press-fit portions 30 may form a gasket that may be inserted in the terminal hole H2 using an insert-molding method.

Figure 10:
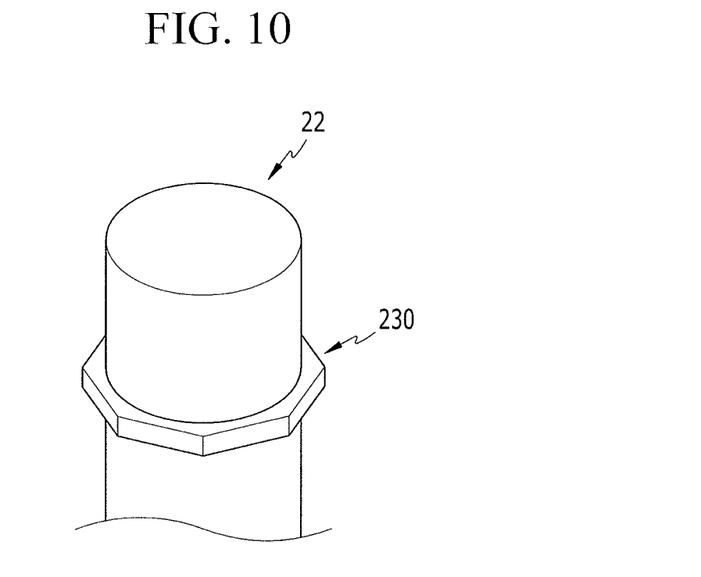
FIG. 10 illustrates a partial schematic perspective view of a press-fit portion protruding from a positive electrode terminal according to an exemplary embodiment.
Figure 11:
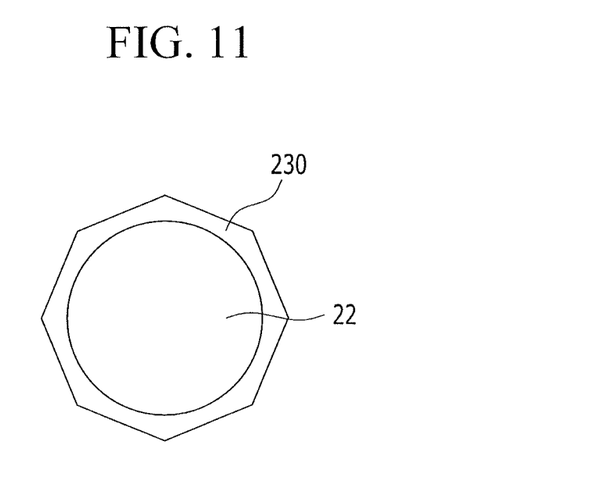
FIG. 11 illustrates a top plan view of the press-fit portion protruding from the positive electrode terminal illustrated in FIG. 10.

FIG. 10 illustrates a partial schematic perspective view of a press-fit portion protruding from a positive electrode terminal according to an exemplary embodiment, and FIG. 11 illustrates a top plan view of the press-fit portion protruding from the positive electrode terminal of FIG. 10. The same reference numerals as those in FIGS. 1 to 9 refer to the same members having the same functions. A detailed description of the same reference numerals will not be repeated hereafter.

As shown in FIGS. 10 and 11, the press-fit portion 30 according to this exemplary embodiment may protrude outward from the positive electrode terminal 22 to have a polygonal shape.

When the press-fit portion 30 protrudes to have the polygonal shape, a contact area with the terminal hole may be further increased such that the press-fit portion 30 may be effectively combined thereto.

By way of summation and review, in a rechargeable battery, an electrode terminal is provided to penetrate a cap plate. A portion between the electrode terminal and the cap plate may be sealed by a gasket. However, when abnormality of the rechargeable battery occurs in the portion between the cap plate and the electrode terminal, an electrolyte solution and the like may be leaked. When a gasket or the like are provided between the cap plate and the electrode terminal to prevent leakage of the electrolyte solution, too many parts are required, thereby making it difficult to effectively prevent the leakage of the electrolyte solution.

Embodiments provide a rechargeable battery in which the number of parts can be reduced without increasing a risk of leakage of an electrolyte solution. The positive electrode terminal may be press-fitted to be fixed to the terminal hole of the cap plate, a gasket may be omitted between the positive electrode terminal and the cap plate, thereby reducing a manufacturing cost. Accordingly, a rechargeable battery may have a reduced manufacturing cost and improved durability.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A rechargeable battery, comprising:
an electrode assembly including first and second electrodes;
a case in which the electrode assembly is accommodated;
a cap plate combined to an opening of the case and electrically connected to the case, the cap plate including a first terminal hole and a second terminal hole each completely penetrating the cap plate;
a first electrode terminal passing through the first terminal hole and a second electrode terminal passing through the second terminal hole; and
a lead tab disposed below the cap plate, the lead tab electrically connecting the electrode assembly to the second electrode terminal,
wherein:
the second electrode terminal includes:
a first end disposed above the cap plate,
a second end disposed below the cap plate, and
a press-fit portion protruding beyond a lateral surface thereof in between the first end and the second end, and
the press-fit portion is disposed in the second terminal hole, the press-fit portion being press-fitted to the second terminal hole and directly contacting and being electrically connected to an inner circumference of the second terminal hole such that the second electrode terminal is electrically connected via the press-fit portion to the cap plate and the case.

2. The rechargeable battery as claimed in claim 1, wherein the second electrode terminal includes:
a plate terminal attached at the first end, the plate terminal being disposed outside of the cap plate above the second terminal hole;
a rivet terminal that forms the second end, the rivet terminal being electrically coupled to the lead tab and penetrating the terminal hole, the rivet terminal being riveted to the plate terminal, wherein the press-fit portion protrudes outwardly from the rivet terminal to be press-fitted to the second terminal hole.

3. The rechargeable battery as claimed in claim 2, wherein the press-fit portion protrudes from an external circumference of the rivet terminal to have a round or circular shape.

4. The rechargeable battery as claimed in claim 2, wherein the second electrode terminal further includes a flange that protrudes integrally from the rivet terminal at an inner side of the cap plate.

5. The rechargeable battery as claimed in claim 2, further including a conductive top plate between the second plate terminal and the cap plate.

6. The rechargeable battery as claimed in claim 2, wherein the cap plate further includes a stopper protrusion that protrudes from a lower part of the second terminal hole to contact the press-fit portion.

7. The rechargeable battery as claimed in claim 6, wherein the stopper protrusion includes a pair of stopper protrusions protruding from the lower part of the second terminal hole.

8. The rechargeable battery as claimed in claim 6, wherein the stopper protrusion protruding from the lower part of the second terminal hole has a round or circular shape.

9. The rechargeable battery as claimed in claim 2, wherein the press-fit portion includes a plurality of press-fit portions protruding outwardly from the rivet terminal.

10. The rechargeable battery as claimed in claim 9, wherein the press-fit portions extend outwardly from the second electrode terminal in a form of protrusions and depressions that are equally spaced.

11. The rechargeable battery as claimed in claim 2, wherein the press-fit portion protrudes outwardly from the second electrode terminal to have a polygonal shape.

* * * * *